US012781087B2

(12) United States Patent
Kwon et al.

(10) Patent No.: US 12,781,087 B2
(45) Date of Patent: Nov. 3, 2026

(54) INSULATION COATING COMPOSITION FOR ELECTRICAL STEEL SHEET, ELECTRICAL STEEL SHEET, AND METHOD FOR MANUFACTURING SAME

(71) Applicant: POSCO CO., LTD, Pohang-si (KR)

(72) Inventors: Min Serk Kwon, Pohang-si (KR); Se-Min Park, Pohang-si (KR); Heon-Jo Choi, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 0 days.

(21) Appl. No.: 18/722,344

(22) PCT Filed: Dec. 20, 2022

(86) PCT No.: PCT/KR2022/020906
§ 371 (c)(1),
(2) Date: Jun. 20, 2024

(87) PCT Pub. No.: WO2023/121269
PCT Pub. Date: Jun. 29, 2023

(65) Prior Publication Data
US 2025/0051603 A1 Feb. 13, 2025

(30) Foreign Application Priority Data
Dec. 22, 2021 (KR) ........................ 10-2021-0185101

(51) Int. Cl.
*C09D 163/00* (2006.01)
*C09D 7/40* (2018.01)
(Continued)

(52) U.S. Cl.
CPC ............. *C09D 163/00* (2013.01); *C09D 7/67* (2018.01); *C21D 8/1283* (2013.01);
(Continued)

(58) Field of Classification Search
CPC ...... C09D 163/00; C09D 7/67; C21D 8/1283; C22C 38/002
See application file for complete search history.

(56) References Cited

U.S. PATENT DOCUMENTS

2008/0153976 A1 6/2008 Akatsuka et al.
2011/0007489 A1 1/2011 Ohigashi et al.
(Continued)

FOREIGN PATENT DOCUMENTS

CN 103003470 A 3/2013
CN 104025207 A 9/2014
(Continued)

OTHER PUBLICATIONS

Extended European Search Report dated Mar. 24, 2025, issued in corresponding European Patent Application No. 22911902.9.
(Continued)

*Primary Examiner* — Nathan T Leong
(74) *Attorney, Agent, or Firm* — Morgan Lewis & Bockius LLP

(57) ABSTRACT

An insulation coating composition for an electrical steel sheet according to an exemplary embodiment of the present disclosure contains 100 parts by weight of a resin containing two or more aromatic rings or aliphatic rings in a repeating unit and 20 to 150 parts by weight of zirconium phosphate.

3 Claims, 1 Drawing Sheet

100

(51) Int. Cl.

| | |
|---|---|
| ***C21D 8/1277*** | (2026.01) |
| ***C22C 38/00*** | (2006.01) |
| ***C22C 38/02*** | (2006.01) |
| ***C22C 38/04*** | (2006.01) |
| ***C22C 38/06*** | (2006.01) |
| ***C22C 38/60*** | (2006.01) |

(52) U.S. Cl.

CPC ............ *C22C 38/002* (2013.01); *C22C 38/02* (2013.01); *C22C 38/04* (2013.01); *C22C 38/06* (2013.01); *C22C 38/60* (2013.01)

(56) References Cited

U.S. PATENT DOCUMENTS

| | | | | |
|---|---|---|---|---|
| 2012/0041102 | A1* | 2/2012 | Chun | C08G 59/5033 525/530 |
| 2013/0115444 | A1* | 5/2013 | Sashi | C22C 38/00 428/331 |
| 2016/0111182 | A1 | 4/2016 | Sashi et al. | |
| 2017/0123314 | A1 | 5/2017 | Kaur et al. | |

FOREIGN PATENT DOCUMENTS

| | | | |
|---|---|---|---|
| CN | 106833286 | A | 6/2017 |
| CN | 110114431 | A | 8/2019 |
| CN | 111542576 | A | 8/2020 |
| JP | 2007-204770 | A | 8/2007 |
| JP | 4359001 | B2 | 11/2009 |
| JP | 2010-013692 | A | 1/2010 |
| JP | 2012-025999 | A | 2/2012 |
| JP | 2012-117103 | A | 6/2012 |
| JP | 2017-160536 | A | 9/2017 |
| JP | 2018-133983 | A | 8/2018 |
| JP | 2018-168469 | A | 11/2018 |
| JP | 6844242 | B2 | 3/2021 |
| KR | 10-2007-0066077 | A | 6/2007 |
| KR | 10-0762466 | B1 | 10/2007 |
| KR | 10-0779575 | B1 | 11/2007 |
| KR | 10-0817157 | B1 | 3/2008 |
| KR | 10-2009-0049371 | A | 5/2009 |
| KR | 10-2009-0069983 | A | 7/2009 |
| KR | 10-2010-0081962 | A | 7/2010 |
| KR | 10-2011-0015167 | A | 2/2011 |
| KR | 10-2011-0072848 | A | 6/2011 |
| KR | 10-2013-0031914 | A | 3/2013 |
| KR | 10-2014-0058249 | A | 5/2014 |
| KR | 10-2014-0085164 | A | 7/2014 |
| KR | 10-2016-0003164 | A | 1/2016 |
| KR | 10-2017-0074110 | A | 6/2017 |
| KR | 10-2018-0044947 | A | 5/2018 |
| KR | 10-2019-0110097 | A | 9/2019 |
| KR | 10-2021-0079696 | A | 6/2021 |
| KR | 10-2021-0151994 | A | 12/2021 |
| WO | 2010-123314 | A2 | 10/2010 |
| WO | 2019/054426 | A1 | 3/2019 |
| WO | 2020/091039 | A1 | 5/2020 |

OTHER PUBLICATIONS

Canadian Office Action dated Jul. 25, 2025 issued in Canadian Patent Application No. 3243037.

Japanese Office Action dated Jul. 8, 2025 issued in Japanese Patent Application No. 2024-538196 (with English translation).

Written Opinion issued in corresponding International Application No. PCT/KR2022/020906 dated Mar. 22, 2023.

International Search Report issued in corresponding International Application No. PCT/KR2022/020906 dated Mar. 22, 2023, with English translation.

Chinese Office Action and Search Report dated Mar. 21, 2026 issued in Chinese Patent Application No. 202280088761.X (with partial English translation).

* cited by examiner

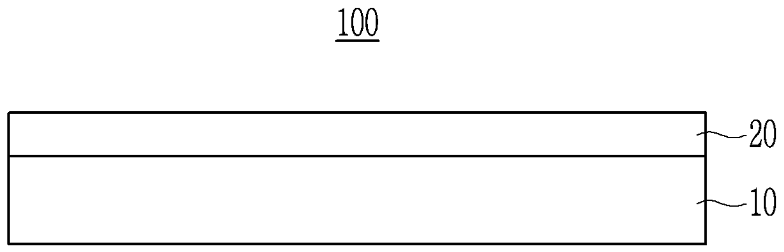
100
20
10

INSULATION COATING COMPOSITION FOR ELECTRICAL STEEL SHEET, ELECTRICAL STEEL SHEET, AND METHOD FOR MANUFACTURING SAME

This application is the National Phase application of International Patent Application No. PCT/KR2022/020906 filed Dec. 20, 2022, which claims priority to Korean Patent Application No. 10-2021-0185101 filed on Dec. 22, 2021, the entire contents of each are hereby incorporated by reference.

TECHNICAL FIELD

An exemplary embodiment of the present disclosure relates to an insulation coating composition for an electrical steel sheet, an electrical steel sheet, and a method for manufacturing the same. More particularly, an exemplary embodiment of the present disclosure relates to an insulation coating composition for an electrical steel sheet that improves adhesion and insulation properties after stress relief annealing (SRA) using a resin containing two or more aromatic rings or aliphatic rings in a repeating unit and zirconium phosphate, an electrical steel sheet, and a method for manufacturing the same.

BACKGROUND ART

An insulation coating of a non-oriented electrical steel sheet used in a motor, a transformer, or the like is required to have various properties in addition to interlayer resistance. For example, the properties include convenience during processing and forming, stability during storage and use, and the like. In addition, since the non-oriented electrical steel sheet is used in a variety of applications, various insulation coatings have been developed depending on the applications.

For example, when the non-oriented electrical steel sheet is subjected to punching, shearing, bending, and the like, magnetic properties deteriorate due to residual strain. Therefore, the stress relief annealing (SRA) at a high temperature is frequently performed to restore the deteriorated magnetic properties. Accordingly, the insulation coating is required to have heat-resistant properties so as to prevent peeling during the stress relief annealing and maintain inherent electrical insulation properties.

Previously, corrosion resistance and insulation properties are improved by applying a mixture of chromic anhydride, magnesium oxide, and an acrylic resin or an acrylic-styrene copolymer resin, but there is a limit to satisfying the recently required level of stress relief annealing properties for a non-oriented electrical steel sheet.

In addition, a method for improving adhesion during stress relief annealing using a metal phosphate as a main component of an insulation coating has been proposed. However, the above method has a problem in that whitening defects occur on a surface due to strong absorption resistance of phosphate, which causes dust to be generated during processing by a client, and the heat resistance rather deteriorates in an area where the whitening defects occur.

DISCLOSURE

Technical Problem

The present disclosure has been made in an effort to provide an insulation coating composition for an electrical steel sheet, an electrical steel sheet, and a method for manufacturing the same. More particularly, the present disclosure has been made in an effort to provide an insulation coating composition for an electrical steel sheet having advantages of improving adhesion and insulation properties after stress relief annealing using a resin containing two or more aromatic rings or aliphatic rings in a repeating unit and zirconium phosphate, an electrical steel sheet, and a method for manufacturing the same.

Technical Solution

An exemplary embodiment of the present disclosure provides an insulation coating composition for an electrical steel sheet containing 100 parts by weight of a resin containing two or more aromatic rings or aliphatic rings in a repeating unit and 20 to 150 parts by weight of zirconium phosphate.

The resin may be an epoxy resin.

The repeating unit may be represented by the following Chemical Formula 1:

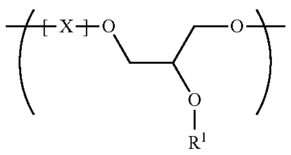

(in Chemical Formula 1, X represents a divalent organic group containing two or more aromatic rings or aliphatic rings, and $R^1$ represents hydrogen, an alkyl group, an alkenyl group, an alkynyl group, a chloroalkyl group, a cycloalkenyl group, an aryl group, a heterocyclic group, an alkoxy group, a carboxy group, or halogen).

In Chemical Formula 1, X may contain one or more of a bisphenol structure, a biphenyl structure, a naphthalene structure, an anthracene structure, and a dicyclopentadiene structure.

A crystalline phase of the zirconium phosphate may be 5 mass % or less.

The insulation coating composition for an electrical steel sheet according to an exemplary embodiment of the present disclosure may further contain 0.1 to 100 parts by weight of magnesium phosphate.

The insulation coating composition for an electrical steel sheet according to an exemplary embodiment of the present disclosure may further contain 0.1 to 100 parts by weight of inorganic nanoparticles.

The inorganic nanoparticles may include one or more of $SiO_2$, $Al_2O_3$, MgO, ZnO, $ZrO_2$, $TiO_2$, $Mn_2O_3$, and CaO.

An average particle diameter of the inorganic nanoparticles may be 1 to 100 nm.

Another exemplary embodiment of the present disclosure provides an electrical steel sheet including an electrical steel sheet substrate and an insulation coating located on a surface of the electrical steel sheet substrate, wherein the insulation coating contains 100 parts by weight of a resin containing two or more aromatic rings or aliphatic rings in a repeating unit and 20 to 150 parts by weight of zirconium phosphate.

The insulation coating may contain, by wt %, one or two or more selected from the group consisting of 6 to 60% of Zr, 7 to 70% of C, 1 to 40% of Si, 1 to 40% of Al, 1 to 45% of Mg, 1 to 70% of P, and 0.01 to 9% of B, and a balance of Fe and unavoidable impurities.

The electrical steel sheet substrate may contain, by wt %, one or two or more selected from the group consisting of 2.0 to 6.5% of Si, 0.1 to 3.0% of Mn, 0.1 to 7.5% of Al, 0.1% or less of B, 0.01 to 0.15% of Sn, and 0.01 to 0.15% of Sb, and a balance of Fe and unavoidable impurities.

Still another exemplary embodiment of the present disclosure provides a method for manufacturing an electrical steel sheet, the method including: preparing an electrical steel sheet substrate; and applying an insulation coating composition to a surface of the electrical steel sheet substrate to form an insulation coating. The insulation coating composition may contain 100 parts by weight of a resin containing two or more aromatic rings or aliphatic rings in a repeating unit and 20 to 150 parts by weight of zirconium phosphate.

Advantageous Effects

According to an exemplary embodiment of the present disclosure, the organic compound having a specific chemical structure and zirconium phosphate are contained, such that adhesion and insulation properties after stress relief annealing are improved.

DESCRIPTION OF THE DRAWINGS

FIG. 1 is a schematic view of a cross section of an electrical steel sheet according to an exemplary embodiment of the present disclosure.

MODE FOR INVENTION

The terms "first", "second", "third", and the like are used to describe various parts, components, regions, layers, and/or sections, but are not limited thereto. These terms are only used to differentiate a specific part, component, region, layer, or section from another part, component, region, layer, or section. Accordingly, a first part, component, region, layer, or section which will be described hereinafter may be referred to as a second part, component, region, layer, or section without departing from the scope of the present disclosure.

Terminologies used herein are to mention only a specific exemplary embodiment, and are not to limit the present disclosure. Singular forms used herein include plural forms as long as phrases do not clearly indicate an opposite meaning. The term "comprising" used in the specification concretely indicates specific properties, regions, integers, steps, operations, elements, and/or components, and is not to exclude the presence or addition of other specific properties, regions, integers, steps, operations, elements, and/or components.

When any part is positioned "on" or "above" another part, it means that the part may be directly on or above the other part or another part may be interposed therebetween. In contrast, when any part is positioned "directly on" another part, it means that there is no part interposed therebetween.

In the notation of a group (atomic group) in the present specification, the notation that does not express substitution and unsubstitution includes a group having no substituent and also a group having a substituent. For example, the term "alkyl group" includes not only an alkyl group having no substituent (an unsubstituted alkyl group), but also an alkyl group having a substituent (a substituted alkyl group).

In the present specification, unless otherwise defined, the term "substitution" means that at least one hydrogen in a compound is substituted with a C1 to C30 alkyl group; a C2 to C30 alkenyl group; a C2 to C30 alkynyl group; a C1 to C10 alkylsilyl group; a C3 to C30 cycloalkyl group; a C6 to C30 aryl group; a C1 to C30 heteroaryl group; a C1 to C10 alkoxy group; a silane group; an alkylsilane group; an alkoxysilane group; an amine group; an alkylamine group; an arylamine group; an ethyleneoxy group; or a halogen group.

In the present specification, the term "hetero" means an atom selected from the group consisting of N, O, S, and P, unless otherwise defined.

In the present specification, the term "alkyl group" means a "saturated alkyl group" without any alkenyl group or alkynyl group, or an "unsaturated alkyl group" including at least one alkenyl group or alkynyl group, unless otherwise defined. The "alkenyl group" means a substituent in which at least two carbon atoms form at least one carbon-carbon double bond, and the term "alkyne group" means a substituent in which at least two carbon atoms form at least one carbon-carbon triple bond. The alkyl group may be a linear, branched, or cyclic alkyl group.

The alkyl group may be a C1 to C20 alkyl group, and specifically a C1 to C6 lower alkyl group, a C7 to C10 middle alkyl group, or a C11 to C20 higher alkyl group.

For example, a C1 to C4 alkyl group means that 1 to 4 carbon atoms are present in an alkyl chain, and is selected from the group consisting of methyl, ethyl, propyl, isopropyl, n-butyl, iso-butyl, sec-butyl, and t-butyl.

Typically, examples of the alkyl group include a methyl group, an ethyl group, a propyl group, an isopropyl group, a butyl group, an isobutyl group, a t-butyl group, a pentyl group, a hexyl group, an ethenyl group, a prophenyl group, a butenyl group, a cyclopropyl group, a cyclobutyl group, a cyclopentyl group, and a cyclohexyl group.

The term "heterocyclic group" means a ring group containing a heteroatom selected from the group consisting of N, O, S, and P in a ring group. The heterocyclic group may contain 1 to 3 heteroatoms in each ring. A heteroaryl group is also included in the heterocyclic group.

In the present specification, unless otherwise defined, an alkyl group, cycloalkyl group, alkenyl group, alkynyl group, aryl group, heteroaryl group, alkoxy group, or aminoalkyl group means a substituted or unsubstituted alkyl group, cycloalkyl group, alkenyl group, alkynyl group, aryl group, heteroaryl group, alkoxy group, or aminoalkyl group.

Unless defined otherwise, all terms including technical terms and scientific terms used herein have the same meanings as understood by those skilled in the art to which the present disclosure pertains. Terms defined in a generally used dictionary are additionally interpreted as having the meanings matched to the related technical document and the currently disclosed contents, and are not interpreted as ideal or very formal meanings unless otherwise defined.

Hereinafter, exemplary embodiments of the present disclosure will be described in detail with reference to the accompanying drawings so that those skilled in the art to which the present disclosure pertains may easily practice the present disclosure. However, the present disclosure may be implemented in various different forms and is not limited to exemplary embodiments described herein.

An insulation coating composition for an electrical steel sheet according to an exemplary embodiment of the present disclosure contains 100 parts by weight of a resin containing two or more aromatic rings or aliphatic rings in a repeating unit and 20 to 150 parts by weight of zirconium phosphate.

The insulation coating composition according to an exemplary embodiment of the present disclosure contains a resin compound having a specific chemical structure and zirconium phosphate to dramatically improve adhesion and insulation properties after stress relief annealing.

Hereinafter, the insulation coating composition for an electrical steel sheet according to an exemplary embodiment of the present disclosure will be described in detail for each component.

First, the insulation coating composition for an electrical steel sheet according to an exemplary embodiment of the present disclosure contains a resin containing two or more aromatic rings or aliphatic rings in a repeating unit.

The resin containing two or more aromatic rings or aliphatic rings in the repeating unit has excellent heat resistance because it contains two or more aromatic ring or aliphatic ring structures. In a case where only one or no aromatic ring or aliphatic ring is contained, problems may occur in terms of coating peeling during a heat treatment process by a client. More specifically, the resin may contain 2 to 5 aromatic rings or aliphatic rings in the repeating unit. The composition may contain two or more types of resins, and in this case, the number of rings may be calculated as a number average of resins in the composition, and all the resins in the composition may contain two or more aromatic rings or aliphatic rings in the repeating unit.

The resin may be an epoxy resin. The epoxy resin may have a chemical structure derived from an epoxy structure in a repeating unit. The epoxy resin may be advantageous in terms of compatibility with zirconium and inorganic nanoparticles and solution stability compared to other resins such as a urethane resin.

More specifically, the resin containing two or more aromatic rings or aliphatic rings in the repeating unit may be represented by the following Chemical Formula 1:

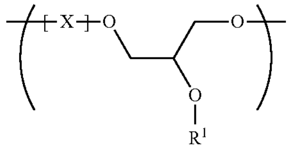

(in Chemical Formula 1, X represents a divalent organic group containing two or more aromatic rings or aliphatic rings, and $R^1$ represents hydrogen, an alkyl group, an alkenyl group, an alkynyl group, a chloroalkyl group, a cycloalkenyl group, an aryl group, a heterocyclic group, an alkoxy group, a carboxy group, or halogen).

More specifically, in Chemical Formula 1, X may contain one or more of a bisphenol structure, a biphenyl structure, a naphthalene structure, an anthracene structure, and a dicyclopentadiene structure.

More specifically, $R^1$ represents hydrogen, an alkyl group, an aryl group, a carboxy group, or halogen.

More specifically, the resin containing two or more aromatic rings or aliphatic rings in the repeating unit may be a bisphenol A epoxy resin, a bisphenol F epoxy resin, a phenol novolac epoxy resin, or a cresol novolac epoxy resin. Still more specifically, Bisphenol A propoxylate diglycidyl ether (Product number 475750) and Poly[(phenyl glycidyl ether)-co-formaldehyde](Product numbers 406775 and 406767) may be used.

The insulation coating composition for an electrical steel sheet according to an exemplary embodiment of the present disclosure contains 20 to 150 parts by weight of zirconium phosphate with respect to 100 parts by weight of the resin.

The zirconium phosphate serves to provide insulation properties and adhesion to the coating.

Various phosphates such as Al, Mg, Ni, Mn, Sr, Br, Ca, Co, and Zn are known as metal phosphates.

In an exemplary embodiment of the present disclosure, among them, zirconium phosphate is used. Compared to other phosphates, the zirconium phosphate reacts stably with the resin containing two or more aromatic rings or aliphatic rings in the repeating unit at a high temperature, which contributes to improving adhesion and insulation properties after SRA.

The zirconium phosphate is contained in an amount of 20 to 150 parts by weight with respect to 100 parts by weight of the resin. When the amount of the zirconium phosphate contained is too small, coating peeling problems may occur. When the amount of the zirconium phosphate contained is too large, a solution viscosity increases rapidly, which may cause coating thickness deviation problems. More specifically, the zirconium phosphate is contained in an amount of 50 to 135 parts by weight with respect to 100 parts by weight of the resin. In an exemplary embodiment of the present disclosure, part(s) by weight refer(s) to a relative weight ratio to the resin.

A crystalline phase of the zirconium phosphate may be 5 mass % or less with respect to 100 mass of the zirconium phosphate. The crystalline phase of the phosphate means that zirconium and phosphoric acid particles are arranged regularly, and may be analyzed using XRD measurement. The more crystalline phases of phosphate are formed, the more pores are formed, which is disadvantageous in terms of high-temperature adhesion. Therefore, an upper limit thereof is limited. Chemical stability is secured by mixing the zirconium phosphate with the resin containing two or more aromatic rings or aliphatic rings, such that the crystalline phase of phosphate may be reduced.

The insulation coating composition for an electrical steel sheet according to an exemplary embodiment of the present disclosure may further contain magnesium phosphate in an amount of 0.1 to 100 parts by weight with respect to 100 parts by weight of the resin. The magnesium phosphate along with the zirconium phosphate described above serves to additionally improve adhesion. However, as described above, in a case where magnesium phosphate is contained without an appropriate amount of zirconium phosphate, the coating layer absorbs moisture and causes whitening defects, resulting in deterioration of surface properties. More specifically, the magnesium phosphate may be further contained in an amount of 1 to 50 parts by weight with respect to 100 parts by weight of the resin.

The insulation coating composition for an electrical steel sheet according to an exemplary embodiment of the present disclosure may further contain inorganic nanoparticles in an amount of 0.1 to 100 parts by weight with respect to 100 parts by weight of the resin.

The inorganic nanoparticles prevent precipitation or agglomeration of the insulation coating composition and contribute to exhibiting more excellent surface properties after stress relief annealing.

The inorganic nanoparticles may be chemically bonded to a substitution product of the resin. When the inorganic nanoparticles are added alone without being bonded to the resin, the inorganic nanoparticles may agglomerate and may not be properly dispersed. The fact that the inorganic nanoparticles are chemically bonded to the substitution product of the resin means that the inorganic nanoparticles are substituted and bonded to a substituent of the substitution product of the resin.

The inorganic nanoparticles may include one or more of $SiO_2$, $Al_2O_3$, MgO, ZnO, $ZrO_2$, $TiO_2$, $Mn_2O_3$, and CaO.

An average particle diameter of the inorganic nanoparticles may be 1 to 100 nm. Within the range described above, appropriate dispersibility may be secured. More specifically, the average particle diameter of the inorganic nanoparticles may be 10 to 50 nm.

When the inorganic nanoparticles are further contained, the inorganic nanoparticles may be further contained in an amount of 0.1 to 100 parts by weight with respect to 100 parts by weight of the resin. When the amount of the inorganic nanoparticles added is too large, the content of the resin may be relatively reduced, which may cause problems with adhesion. More specifically, the inorganic nanoparticles may be further contained in an amount of 10 to 80 parts by weight.

The insulation coating composition according to an exemplary embodiment of the present disclosure may further contain an oxidation promoter. Examples of the oxidation promoter include sodium perborate ($NaBO_3 \cdot 4H_2O$). The oxidation promoter may be contained in an amount of 5 parts by weight or less with respect to 100 parts by weight of the resin.

In addition to the components described above, the insulation coating composition may contain a solvent to facilitate application and to uniformly disperse the components. As the solvent, water, alcohol, and the like may be used. The amount of the solvent is not particularly limited, and the solvent may be contained in an amount of 50 parts by weight to 1,000 parts by weight with respect to 100 parts by weight of the resin.

FIG. 1 is a schematic view of a cross section of an electrical steel sheet 100 according to an exemplary embodiment of the present disclosure. As illustrated in FIG. 1, the electrical steel sheet 100 according to an exemplary embodiment of the present disclosure includes an electrical steel sheet substrate and an insulation coating 20 located on a surface of the electrical steel sheet substrate 10.

As the electrical steel sheet substrate 10, a general non-oriented or grain-oriented electrical steel sheet may be used without limitation. In an exemplary embodiment of the present disclosure, the main configuration is to form the insulation coating 20 of a special component on the electrical steel sheet substrate 10, and therefore, a detailed description of the electrical steel sheet substrate 10 will be omitted. In FIG. 1, the insulation coating 20 is present on an upper surface of the electrical steel sheet substrate 10, but is not limited thereto, and the insulation coating 20 may be present on a lower surface or the upper and lower surfaces of the electrical steel sheet substrate 10.

The insulation coating 20 may contain 100 parts by weight of a resin containing two or more aromatic rings or aliphatic rings in a repeating unit and 20 to 150 parts by weight of zirconium phosphate.

The insulation coating 20 of the electrical steel sheet 100 according to an exemplary embodiment of the present disclosure contains a specific resin and zirconium phosphate to dramatically improve adhesion and insulation properties after stress relief annealing.

Since the components of the insulation coating 20 have been described in detail in relation to the insulation coating composition described above, redundant descriptions will be omitted. The chemical structures of some resins may be modified during the formation of the insulation coating 20, but most resins maintain their chemical structures. Since volatile components such as a solvent are removed during the formation of the insulation coating 20, a composition ratio in the insulation coating 20 is substantially the same as the relative weight ratio to the resin in the insulation coating composition.

The insulation coating 20 may contain, by wt %, one or two or more selected from the group consisting of 6 to 60% of Zr, 7 to 70% of C, 1 to 40% of Si, 1 to 40% of Al, 1 to 45% of Mg, 1 to 70% of P, and 0.01 to 9% of B, and a balance of Fe and unavoidable impurities. More specifically, the insulation coating 20 may contain, by wt %, 7 to 70% of C, 6 to 60 wt % of Zr, and 1 to 70% of P, one or two or more selected from the group consisting of 1 to 40% of Si, 1 to 40% of Al, 1 to 45% of Mg, and 0.01 to 9% of B, and a balance of Fe and unavoidable impurities. Still more specifically, the insulation coating 20 may contain, by wt %, 6 to 60% of Zr, 7 to 70% of C, 1 to 40% of Si, 1 to 40% of Al, 1 to 45% of Mg, 1 to 70% of P, and 0.01 to 9% of B, and a balance of Fe and unavoidable impurities.

C may be derived from the resin in the insulation coating composition. Zr and P may be derived from the zirconium phosphate in the insulation coating composition.

The remaining Si, Al, Mg, B, and the like may diffuse from the electrical steel sheet substrate 10 or may be derived from additional components of the insulation coating composition.

The insulation coating 20 may contain elements derived from the insulation coating composition and the electrical steel sheet substrate 10, in addition to the elements described above.

A thickness of the insulation coating 20 may be 0.05 to 10 μm. When the thickness of the insulation coating 20 is too thin, heat resistance is reduced, which may cause deterioration of iron loss after stress relief annealing. When the thickness of the insulation coating 20 is too thick, a space factor is reduced, which may cause deterioration of characteristics of the motor. Therefore, the thickness of the insulation coating 20 may be adjusted to the range described above. More specifically, the thickness of the insulation coating 20 may be 0.1 to 5 μm.

As the electrical steel sheet substrate 10, a non-oriented electrical steel sheet or a grain-oriented electrical steel sheet may be used without limitation. Specifically, a non-oriented electrical steel sheet may be used. In an exemplary embodiment of the present disclosure, insulation properties are generated by the components of the insulation coating 20, and may be unrelated to alloy components of the electrical steel sheet. Hereinafter, as an example, the alloy components of the electrical steel sheet will be described.

The electrical steel sheet substrate 10 may contain, by wt %, one or two or more selected from the group consisting of 2.0 to 6.5% of Si, 0.1 to 3.0% of Mn, 0.1 to 7.5% of Al, 0.1% or less of B, 0.01 to 0.15% of Sn, and 0.01 to 0.15% of Sb, and a balance of Fe and unavoidable impurities. More specifically, the electrical steel sheet substrate 10 may contain, by wt %, 2.0 to 6.5% of Si, 0.1 to 3.0% of Mn, 0.1 to 7.5% of Al, 0.1% or less of B, 0.01 to 0.15% of Sn, and 0.01 to 0.15% of Sb, and a balance of Fe and unavoidable impurities.

Hereinafter, the reason for the limitation of the components of the electrical steel sheet substrate 10 will be described.

Si: 2.0 to 6.5 wt %

Silicon (Si) is a component that increases resistivity of steel and lowers eddy current loss in iron loss, and when a content of Si is too high, brittleness increases, which makes it difficult to perform cold-rolling. Therefore, it is preferable that the content of Si is limited to 6.5 wt % or less. More specifically, Si may be contained in an amount of 2.5 to 4.5 wt %.

Mn: 0.1 to 3.0 wt %

When manganese (Mn) is present in an amount of less than 0.1 wt %, fine MnS precipitates are formed, which inhibits grain growth and causes deterioration of magnetism. Therefore, when Mn is present in an amount of 0.1 wt % or more, coarse MnS may be formed, and it is possible to prevent S components from precipitating into CuS, which is a finer precipitate. However, when the amount of Mn is increased, magnetism deteriorates, and therefore, Mn is added in an amount of 3.0 wt % or less. More specifically, Mn may be contained in an amount of 0.5 to 2.0 wt %.

Al: 0.1 to 7.5 wt %

Al is an effective component to reduce eddy current loss by increasing the resistivity. When a content of Al is less than 0.1 wt %, AlN is finely precipitated, resulting in deterioration of magnetism, and when the content of Al exceeds 7.5 wt %, processability deteriorates. Therefore, it is preferable that the content of Al is limited to 7.5 wt % or less. More specifically, Al may be contained in an amount of 0.5 to 3.0 wt %.

B: 0.1 wt % or Less

B may form precipitates such as BN and cause deterioration of magnetism, and therefore, B may be contained in an amount of 0.100 wt % or less. More specifically, B may be contained in an amount of 0.001 to 0.050 wt %.

Sn, Sb: 0.01 to 0.15 wt % Each

Sb and Sn are surface precipitated elements that are concentrated in a surface layer part of a steel sheet to suppress nitrogen adsorption, and as a result, Sb and Sn serve to reduce iron loss by not interfering with growth of grains. When contents of Sb and Sn are too high, grain boundary segregation may occur severely, which may cause an increase in brittleness of the steel sheet and cause sheet fracture during rolling. More specifically, each of Sn and Sb may be contained in an amount of 0.05 to 0.10 wt %.

The electrical steel sheet substrate 10 may further contain 0.01 wt % or less of C, 0.5 wt % or less of P, 0.005 wt % or less of S, 0.005 wt % or less of N, and 0.005 wt % or less of Ti.

A method for manufacturing an electrical steel sheet according to an exemplary embodiment of the present disclosure includes preparing an electrical steel sheet substrate; and applying an insulation coating composition to a surface of the electrical steel sheet substrate to form an insulation coating.

First, in step S10, an electrical steel sheet substrate is manufactured. Since the alloy components of the electrical steel sheet substrate have been described in detail, repeated descriptions will be omitted.

The manufacturing of the electrical steel sheet substrate may include manufacturing a hot-rolled sheet by hot-rolling a slab; manufacturing a cold-rolled sheet by cold-rolling the hot-rolled sheet; and annealing the cold-rolled sheet.

First, a slab is heated. In this case, the heating of the slab may be performed at 1,200° C. or lower.

Next, a hot-rolled sheet is manufactured by hot-rolling the heated slab. The manufactured hot-rolled sheet may be hot-rolled and annealed.

Next, a cold-rolled sheet is manufactured by cold-rolling the hot-rolled sheet. The cold-rolling may be performed once or cold-rolling including intermediate annealing may be performed twice or more.

Next, the cold-rolled sheet is annealed. In this case, in the annealing of the cold-rolled sheet, rolling oil present in the cold-rolled sheet may be degreased, primary annealing may be performed, and secondary annealing may be performed in an atmosphere composed of hydrogen and nitrogen. In addition, in the final annealing, in order to prevent deterioration of magnetism due to formation of oxide on a surface, a dew point temperature may be controlled to −5° C. or lower.

Going back to the description of the method for manufacturing an electrical steel sheet, next, in step S20, an insulation coating composition is applied to a surface of the electrical steel sheet substrate to form an insulation coating. Since the insulation coating composition is the same as described above, a redundant description will be omitted.

The forming of the insulation coating may include subjecting the steel sheet to which the insulation coating composition is applied to a heat treatment at a temperature of 100 to 680° C. When the heat treatment temperature is too low, it is difficult to remove a solvent, and it is difficult to form an insulation coating with an excellent appearance. When the heat treatment temperature is too high, adhesion may deteriorate. More specifically, the heat treatment may be performed at a temperature of 350 to 650° C. A heat treatment time may be 5 to 200 seconds.

The method for manufacturing an electrical steel sheet may further include, after the forming of the insulation coating, performing stress relief annealing at a temperature of 700 to 1,000° C. In an exemplary embodiment of the present disclosure, excellent adhesion and surface properties of the insulation coating may be maintained even after the stress relief annealing. When the temperature of the stress relief annealing is too low, desired stress relief may not be achieved smoothly. When the temperature of the stress relief annealing is too high, magnetism of the electrical steel sheet may deteriorate.

The stress relief annealing may be performed in a nitrogen atmosphere and may be performed for 1 to 5 hours.

Hereinafter, preferred examples of the present disclosure, comparative examples thereof, and evaluation examples thereof will be described. However, each of the following examples is merely a preferred example of the present disclosure, and the present disclosure is not limited to the following examples.

Preparation Examples

Preparation of Epoxy Resin Containing Acrylate Group 20 g of an epoxy resin of the following chemical formula as a starting material was added to 120 ml of methylene chloride in a 500 ml flask at room temperature, and stirring was performed. 9.88 ml of diisopropylethylamine was added at 4° C., and immediately 9 ml of acryloyl chloride was slowly added. After reacting at 4° C. for 5 hours, a solvent was removed by evaporation under reduced pressure, and then an epoxy resin containing an acrylate group was obtained.

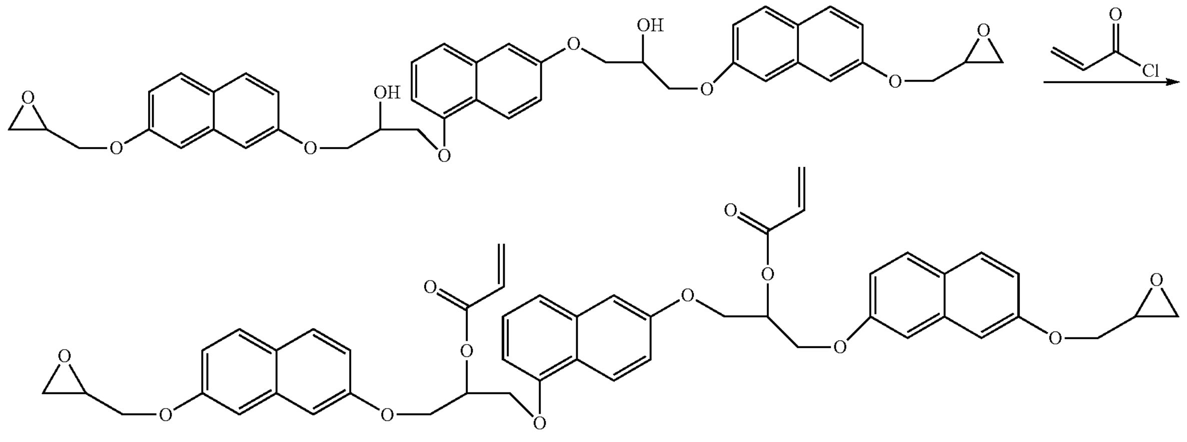

Preparation of Epoxy Resin Containing Side Epoxy Resin 1.6 g of NaH was added to a flask at room temperature and dissolved in 40 ml of DMF, and 10 g of an epoxy resin of the following chemical formula as a starting material dissolved in 20 ml of DMF at 4° C. was slowly added. After stirring at 4° C. for 10 minutes, 4.5 ml of epichlorohydrin was slowly added and then reacted at room temperature for 24 hours. After separating an organic layer, a solvent was removed by evaporation under reduced pressure, thereby obtaining an epoxy resin containing a side epoxy group.

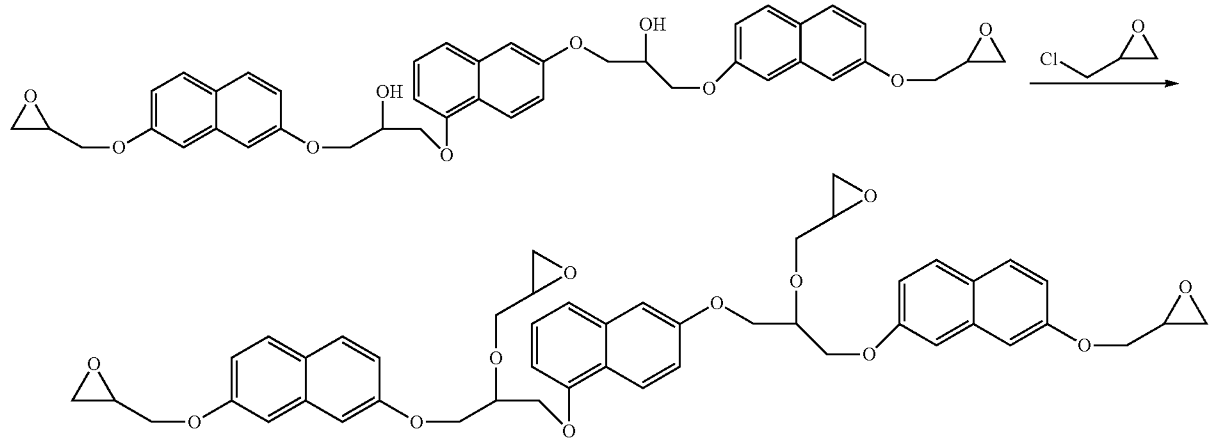

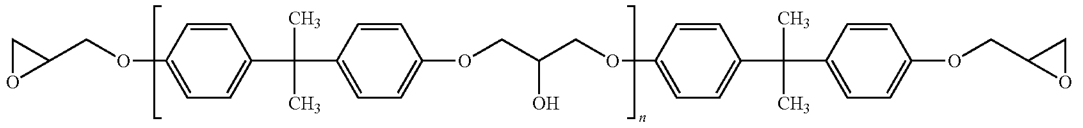

Bisphenol A Epoxy Resin (DGEBA)

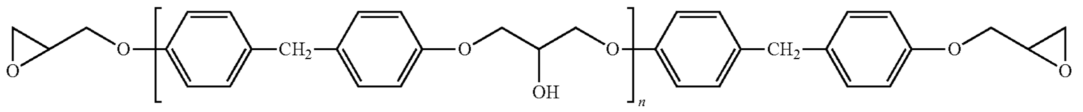

Bisphenol F Epoxy Resin (DGEBF)

Phenolic Novolac Epoxy Resin

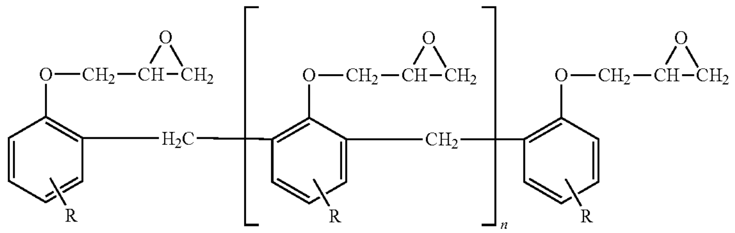

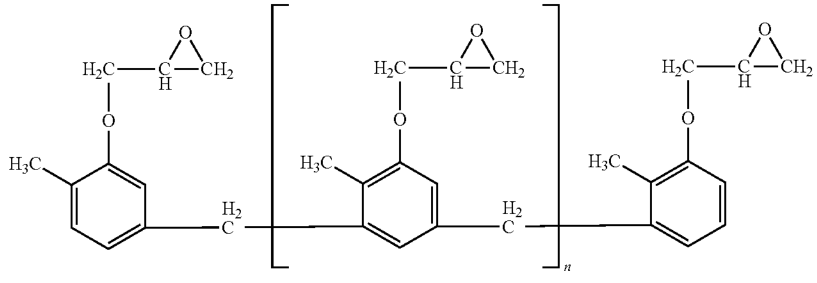

O-Cresol Novolac

Example 1

A slab containing 3.4 wt % of silicon (Si), 0.80 wt % of aluminum (Al), 0.17 wt % of manganese (Mn), 0.0015 wt % of titanium (Ti), 0.03 wt % of tin (Sn), 0.01 wt % of nickel, 0.003 wt % of carbon (C), 0.0013 wt % of nitrogen (N), 0.012 wt % of phosphorus (P), 0.001 wt % of sulfur (S), and a balance of Fe and unavoidable impurities was prepared.

The slab was heated at 1,130° C. and then was hot-rolled to a thickness of 2.3 mm to manufacture a hot-rolled sheet.

The hot-rolled sheet was coiled at 650° C., cooled in air, annealed at 1,040° C. for 2 minutes, quenched in water, pickled, and then cold-rolled to a thickness of 0.25 mm, thereby manufacturing a cold-rolled sheet.

A dew point temperature was adjusted in an atmosphere composed of 20% hydrogen and 80% nitrogen at 1,040° C. for 50 seconds, and the cold-rolled sheet was subjected to final annealing, thereby manufacturing an annealed steel sheet.

As an insulation coating composition, the resin prepared in the preparation example, zirconium phosphate, $SiO_2$, and magnesium phosphate were mixed with distilled water to prepare a slurry, the slurry was applied to the final annealed steel sheet using a roll, subjected to a heat treatment at 650° C. for seconds, and then cooled in air. The electrical steel sheet was subjected to stress relief annealing (SRA) in a 100% nitrogen atmosphere at 750° C. for 2 hours and then cooled in air.

The process was performed by changing the contents of the resin, zirconium phosphate, $SiO_2$, and magnesium phosphate in the insulation coating composition as shown in Table 1.

The properties of the electrical steel sheets manufactured in the examples and comparative examples were measured and summarized in Table 1.

In addition, the insulation properties were evaluated by measuring the upper portion of the insulation coating using a Franklin measuring instrument according to ASTM A717 international standard.

In addition, the adhesion is expressed as the minimum arc diameter without the coating peeling when the specimen is bent 180° in contact with a 10 to 100 mm arc.

In Comparative Example 1, 1,2-epoxy-3-phenoxypropane was used instead of the resin prepared in the preparation example.

TABLE 1

| Remark | Resin (parts by weight) | Zirconium phosphate (parts by weight) | Silica (parts by weight) | Magnesium phosphate (parts by weight) | Thickness (um) | Insulation (mA) | Insulation after SRA (mA) | Adhesion after SRA (mmphi) |
|---|---|---|---|---|---|---|---|---|
| Example 1 | 100 | 87 | 31 | 6 | 0.40 | 220 | 400 | 10 |
| Example 2 | 100 | 71 | 4 | 28 | 0.72 | 340 | 580 | 10 |
| Example 3 | 100 | 89 | 37 | 19 | 1.00 | 350 | 580 | 10 |
| Example 4 | 100 | 89 | 36 | 6 | 0.99 | 358 | 653 | 10 |
| Example 5 | 100 | 41 | 15 | 14 | 0.72 | 560 | 670 | 10 |
| Example 6 | 100 | 90 | 74 | 74 | 1.46 | 0 | 120 | 10 |
| Example 7 | 100 | 72 | 56 | 88 | 1.36 | 90 | 110 | 10 |
| Example 8 | 100 | 109 | 10 | 22 | 1.13 | 60 | 550 | 10 |
| Example 9 | 100 | 134 | 24 | 48 | 1.50 | 110 | 700 | 10 |
| Example 10 | 100 | 118 | 12 | 28 | 0.20 | 390 | 544 | 30 |

TABLE 1-continued

| Remark | Resin (parts by weight) | Zirconium phosphate (parts by weight) | Silica (parts by weight) | Magnesium phosphate (parts by weight) | Thickness (um) | Insulation (mA) | Insulation after SRA (mA) | Adhesion after SRA (mmphi) |
|---|---|---|---|---|---|---|---|---|
| Comparative Example 1 | 100 (1,2-Epoxy-3-phenoxy-propane) | 90 | 36 | 19 | 0.89 | 890 | 990 | 70 |
| Comparative Example 2 | 100 | 15 | 36 | 200 | — | — | — | — |
| Comparative Example 3 | 100 | 17 | 7 | 19 | 1.09 | 102 | 820 | 80 |
| Comparative Example 4 | 100 | 178 | 189 | 60 | 0.70 | 200 | 180 | 100 |
| Comparative Example 5 | 100 | 207 | 78 | 62 | 0.17 | 420 | 630 | 80 |

As shown in Table 1, in Examples 1 to 10 in which the ratios of the resin and the zirconium phosphate were appropriately adjusted, it could be confirmed that the insulation properties before and after SRA and the adhesion after SRA were excellent.

On the other hand, in Comparative Example 1 in which an appropriate resin was not used, it could be confirmed that the insulation properties and adhesion after SRA were poor.

In Comparative Examples 2 and 3 in which a small amount of zirconium phosphate was used, it could be confirmed that the insulation properties and adhesion after SRA were poor.

In Comparative Examples 4 and 5 in which an excessive amount of zirconium phosphate was contained, it could be confirmed that the adhesion after SRA was poor.

The present disclosure is not limited to the exemplary embodiments, but may be prepared in various different forms, and it will be apparent to those skilled in the art to which the present disclosure pertains that the exemplary embodiments may be implemented in other specific forms without departing from the spirit or essential feature of the present disclosure. Therefore, it is to be understood that the exemplary embodiments described hereinabove are illustrative rather than restrictive in all aspects.

DESCRIPTION OF SYMBOLS

100: Electrical steel sheet 10: Electrical steel sheet substrate

20: Insulation coating

The invention claimed is:

1. An electrical steel sheet comprising:

an electrical steel sheet substrate; and an insulation coating located on a surface of the electrical steel sheet substrate, wherein the insulation coating contains 100 parts by weight of a resin containing a repeating unit represented by the following Chemical Formula 1 and 20 to 150 parts by weight of zirconium phosphate,

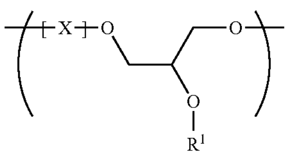

in Chemical Formula 1, X represents a divalent organic group containing one or more of a bisphenol structure, a biphenyl structure, a naphthalene structure, an anthracene structure, and a dicyclopentadiene structure, and $R^1$ represents hydrogen, an alkyl group, an alkenyl group, an alkynyl group, a chloroalkyl group, a cycloalkenyl group, an aryl group, a heterocyclic group, an alkoxy group, a carboxy group, or halogen.

2. The electrical steel sheet of claim 1, wherein:

the insulation coating contains, by wt %, one or two or more selected from the group consisting of 6 to 60% of Zr, 7 to 70% of C, 1 to 40% of Si, 1 to 40% of Al, 1 to 45% of Mg, 1 to 70% of P, and 0.01 to 9% of B, and a balance of Fe and unavoidable impurities.

3. The electrical steel sheet of claim 1, wherein:

the electrical steel sheet substrate contains, by wt %, one or two or more selected from the group consisting of 2.0 to 6.5% of Si, 0.1 to 3.0% of Mn, 0.1 to 7.5% of Al, 0.1% or less of B, 0.01 to 0.15% of Sn, and 0.01 to 0.15% of Sb, and a balance of Fe and unavoidable impurities selected from C, P, Sn, N and Ti.

* * * * *